Aug. 29, 1950   J. T. B. CLINE   2,520,274
BARK STRIPPER AND SPLITTER
Filed March 10, 1947   2 Sheets-Sheet 1

Inventor
John T. Bill Cline

By *Clarence A. O'Brien
and Harvey B. Jacobson*
Attorneys

Aug. 29, 1950     J. T. B. CLINE     2,520,274
BARK STRIPPER AND SPLITTER

Filed March 10, 1947     2 Sheets-Sheet 2

Inventor
John T. Bill Cline

By Clarence A. O'Brien
and Harvey B. Jacobson
Attorneys

Patented Aug. 29, 1950

2,520,274

UNITED STATES PATENT OFFICE 2,520,274

BARK STRIPPER AND SPLITTER

John T. Bill Cline, Eureka, Calif.

Application March 10, 1947, Serial No. 733,646

3 Claims. (Cl. 144—208)

The present invention relates to new and useful improvements in apparatus for peeling or stripping bark from logs and more particularly to power operated means for this purpose. An important object of the present invention is to provide a bark peeler including a plurality of wedges driven into the end of a log under the bark, the wedges being connected to each other for movement as a unit under the bark and attaching a cable to the wedges to be pulled by suitable power means whereby to pull the wedges along the log under the bark and thus remove the bark therefrom.

Other objects and advantages reside in the details of construction and operation as more fully hereinafter described and claimed, reference being had to the accompanying drawings forming part hereof, wherein like numerals refer to like parts throughout, and in which:

Figure 1:
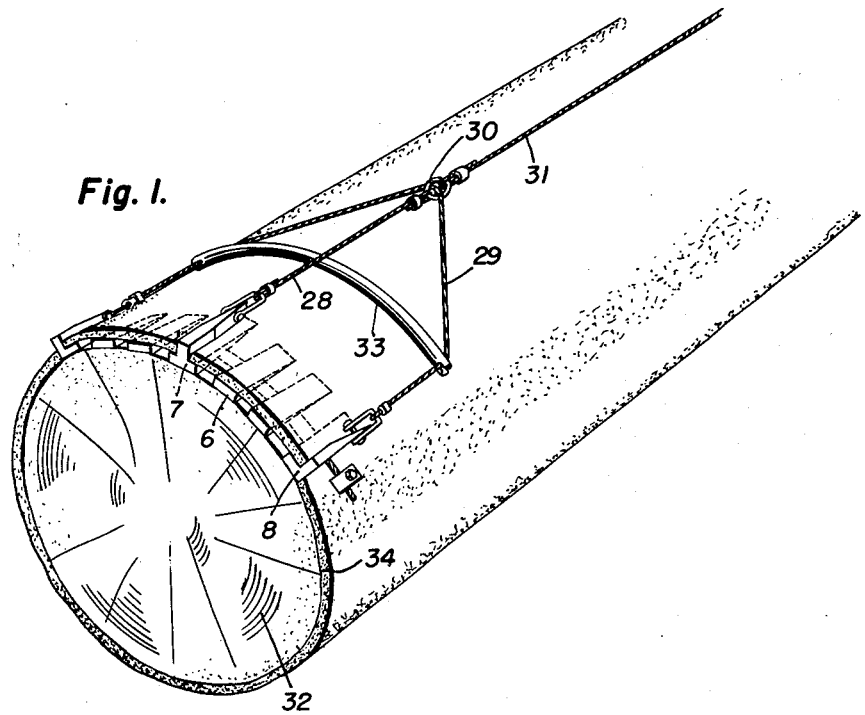
Figure 1 is a perspective view showing the device in stripping position.

Referring now to the drawings in detail wherein for the purpose of illustration I have disclosed a preferred embodiment of the invention, the numeral 5 designates the stripping device generally, and the latter is composed of a plurality of stripping wedges 6 positioned horizontally and between groups of which is positioned a center splitting wedge 7 while at the ends of the stripping wedges 6 are placed end splitting wedges 8.

Figure 6:
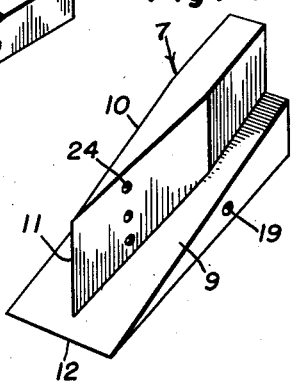
Figure 6 is a similar view of the center splitting wedge.
Figure 5:
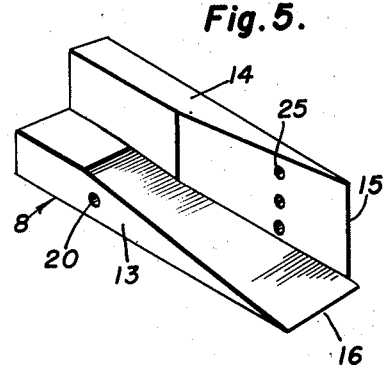
Figure 7:
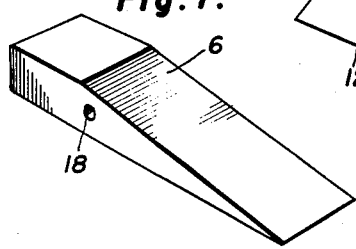
Figure 7 is a perspective view of one of the intermediate stripping wedges.

As shown more clearly in Figure 6 of the drawing the center splitting wedge 7 includes a horizontal wedge 9 forming the base for the splitter and from the central portion of which rises a vertical wedge 10 which has a double bevelled front edge 11 disposed perpendicularly at the center of the front cutting edge 12 of the wedge 9 and positioned slightly rearwardly from the edge 12.

The end splitters 8 include a horizontal wedge 13 to one longitudinal edge of which is formed or suitably secured a vertical wedge 14 which has its inner face beveled to provide a perpendicular front cutting edge 15 positioned at one side of the wedge 13 and slightly rearwardly from the front cutting edge 16 thereof.

Figure 2:
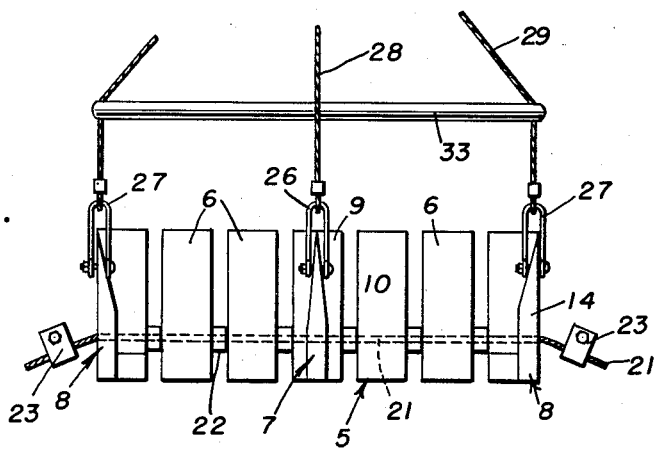
Figure 2 is a top plan view showing the stripper removed from the log.
Figure 3:
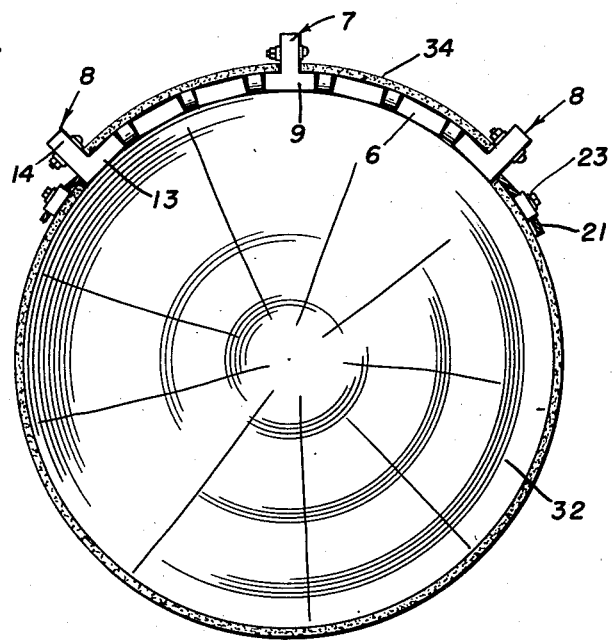
Figure 3 is an end elevational view.
Figure 4:
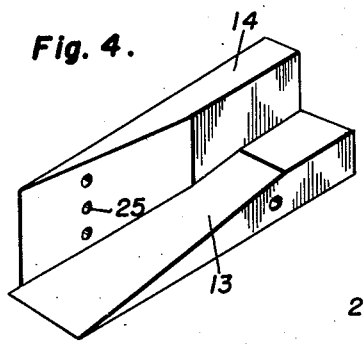
Figures 4 and 5 are perspective views of the end splitting wedges.

Both of the end splitters 8 have vertical and horizontal wedge portions, but the vertical wedge portions are located along opposite and outer sides of the horizontal wedge portions, as shown in Figure 2 of the drawing.

The horizontal wedges 6 are formed adjacent their rear ends with a transversely extending bore or opening 18 and base wedges 9 and 13 of the splitters 7 and 8 respectively are likewise formed with transversely extending bores 19 and 20 aligned with the bores 18 and through which a cable 21 is inserted with spacers 22 positioned on the cable between adjacent horizontal wedges. The wedges are loosely positioned on the cable 21 and each end of the cable is provided with a cable clamp 23 to prevent separation of the wedges therefrom.

The vertical center splitting wedge 10 is formed adjacent its front end with a plurality of vertically spaced openings 24 and similar openings 25 are also formed in the vertical wedges 14 of the end splitters 8. A clevis 26 is connected in one of the openings 24 and clevises 27 are connected in one of the openings 25 of the end splitters. Cables 28 and 29 extend forwardly from the clevises 26 and 27 and are attached to a ring 30 to which a pulling cable 31 is also attached.

The cable 31 extends longitudinally of a log 32 for winding on a winch or other power device (not shown). A spreader 33 extends between the side cables 29.

In the operation of the device the stripping wedges 6 and splitting wedges 7 and 8 are driven in one end of a log so as to lie just under the bark 34 so that a pulling force exerted on the cable 31 will draw the wedges longitudinally of the log and beneath the bark in such manner as to strip off the bark. The center splitting wedge 7 and end splitting wedges 8 will cut the bark in strips of a desired width depending on the number of stripping wedges 6 positioned between the splitters.

The clevises 26 and 27 may be adjusted in the vertically spaced openings 24 and 25 in accordance with the thickness of the bark.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the scope of the appended claims.

I claim:

1. A bark stripper comprising a plurality of vertical wedges and a plurality of horizontal wedges, each of said wedges having its cutting edge at a front end, the cutting edges of said horizontal wedges being drivable into the end of a log under the bark, said horizontal wedges being positioned between the vertical wedges, each of said wedges having a transverse opening adjacent its rear end, a flexible connector extending through the openings to connect the wedges to each other for movement as a unit, and means connected to the front ends of certain of the wedges to exert a pulling force thereon.

2. A bark stripper comprising a plurality of vertical wedges and a plurality of horizontal wedges, each of said wedges having its cutting edge at a front end, the cutting edges of said horizontal wedges being drivable into the end of a log under the bark, said horizontal wedges being positioned between the vertical wedges, each of said wedges having a transverse opening adjacent its rear end, a flexible connector extending through the openings to connect the wedges to each other for movement as a unit, and cables connected to the front ends of the vertical wedges so as to enable a pulling force to be exerted thereon.

3. A bark stripper comprising a plurality of vertical wedges and a plurality of horizontal wedges, each of said wedges having its cutting edge at a front end, the cutting edges of said horizontal wedges being drivable into the end of a log under the bark, said horizontal wedges being positioned between the vertical wedges, each of said wedges having a transverse opening adjacent its rear end, a flexible connector extending through the openings to connect the wedges to each other for movement as a unit, said vertical wedges having vertically spaced openings at their front ends, and cables attached to said vertical wedges at selected vertically spaced openings so as to enable a pulling force to be exerted thereon.

JOHN T. BILL CLINE.

REFERENCES CITED

The following references are of record in the file of this patent:

UNITED STATES PATENTS

| Number | Name | Date |
| --- | --- | --- |
| 707,428 | Kidder | Aug. 19, 1902 |
| 739,495 | Kidder | Sept. 22, 1903 |
| 1,558,735 | McArthur | Oct. 27, 1925 |
| 1,887,853 | Jinnet | Nov. 15, 1932 |

FOREIGN PATENTS

| Number | Country | Date |
| --- | --- | --- |
| 306,578 | Germany | July 2, 1918 |